Patented June 22, 1926.

1,589,682

UNITED STATES PATENT OFFICE.

IVAR WALFRID CEDERBERG, OF LIDINGO-BREVIK, NEAR STOCKHOLM, SWEDEN, AND MIKAL FJELLANGER AND VILHELM GRÜNER, OF SKOIEN, NORWAY, ASSIGNORS TO NORSK HYDRO-ELEKTRISK KVAELSTOFAKTIESELSKAB, OF CHRISTIANIA, NORWAY.

CATALYST FOR SYNTHESIS OF AMMONIA.

No Drawing. Application filed September 7, 1921, Serial No. 498,969, and in Norway September 7, 1920.

This invention relates to a catalyst useful in the synthesis of ammonia from nitrogen and hydrogen.

In German Patent No. 285,698 is described a method for producing ammonia by the use of catalysts containing alkali metal or alkali earth metal ferrocyanides or ferricyanides.

It is stated in said patent that the effect produced is specific to these compounds, and that the ferrocyanides or ferricyanides of the heavy metals, for example Berlin blue (ferri-ferro cyanide), have only a weak contact effect.

The present invention is based upon the discovery that these compounds, the heavy metal ferro- and ferri-cyanides which are insoluble in water will act catalytically, provided they are freed from the soluble simple heavy metal salts. Such soluble simple heavy metal salts have an intense reducing or poisoning influence on the catalytic effect of the compound in question.

If it is desired to produce a usable catalyst, one will have either to effect precipitation from the soluble ferro- or ferri-cyanide, e. g., potassium ferro- or ferri-cyanide, with heavy metal salts in such a way that there is always a surplus or excess of cyanogen salt present, so as to have no excess of heavy metal salts, or one will have to wash the product until the soluble simple heavy metal salts are removed.

The precipitate can be placed directly in the contact furnace, where the heating takes place in an atmosphere free from oxygen.

These catalysts work at low temperatures, below 400° C., and pressures below 100 atmospheres.

We claim—

1. Catalyst for the production of ammonia from nitrogen and hydrogen, comprising a precipitate resulting from complex iron cyanides and simple heavy metal salts, said precipitate being free from simple heavy metal salts and heated under pressure in an atmosphere free of oxygen.

2. Method of producing a catalyst for the production of ammonia from nitrogen and hydrogen, consisting in precipitating simple heavy metal salts with an excess of complex iron cyanides, and heating the precipitate in an atmosphere free from oxygen.

In testimony that we claim the foregoing as our invention, we have signed our names.

IVAR WALFRID CEDERBERG.
MIKAL FJELLANGER.
VILHELM GRÜNER.